United States Patent [19]

Matsuzaki

[11] Patent Number: 5,126,903
[45] Date of Patent: Jun. 30, 1992

[54] COMBINATION OF A MAGNETIC HEAD AND A MAGNETIC HEAD SUPPORTING DEVICE

[75] Inventor: Mikio Matsuzaki, Tokyo, Japan
[73] Assignee: TDK Corporation, Tokyo, Japan
[21] Appl. No.: 517,722
[22] Filed: May 2, 1990
[30] Foreign Application Priority Data
 May 3, 1989 [JP] Japan .................................. 1-113219
[51] Int. Cl.⁵ .......................... G11B 5/48; G11B 21/16
[52] U.S. Cl. ..................................................... 360/104
[58] Field of Search .............................. 360/104, 105
[56] References Cited
 U.S. PATENT DOCUMENTS

| 3,931,641 | 1/1976 | Watrous . |
| 4,167,765 | 9/1979 | Watrous . |
| 4,670,804 | 6/1987 | Kant et al. . |
| 4,734,805 | 3/1988 | Yamada et al. . |
| 4,761,699 | 8/1988 | Ainslie et al. . |
| 4,789,914 | 12/1988 | Ainslie et al. . |
| 4,803,577 | 2/1988 | Ezaki et al. . |

OTHER PUBLICATIONS

IBM 3370 Film Head Design and Fabrication, Feb. 1980, Robert E. Jones, Jr., pp. 6-9.

Primary Examiner—A. J. Heinz
Attorney, Agent, or Firm—Oblon, Spivak, McClelland, Maier & Neustadt

[57] ABSTRACT

A combination of a magnetic head and a magnetic head supporting device comprises a thin film magnetic head and a magnetic head supporting member, wherein the thin film magnetic head is provided with a reading/writing element at an end surface of a slider, and bonding pads for the reading/writing element are led to at least a side end surface of the slider, which is different from the end surface where the reading/writing element is located.

4 Claims, 7 Drawing Sheets

COMBINATION OF A MAGNETIC HEAD AND A MAGNETIC HEAD SUPPORTING DEVICE

BACKGROUND OF THE INVENTION

1. FIELD OF THE INVENTION

The present invention relates to a combination of a magnetic head and a magnetic head supporting device comprising a thin film magnetic head and a magnetic head supporting member.

2. DISCUSSION OF BACKGROUND

In a combination of the magnetic head and the magnetic head supporting device of this type (hereinafter, referred to as a magnetic head supporting device), the following requirements have to be satisfied in order that the thin film magnetic head can follow tracks formed in a surface of the magnetic disk with a predetermined small gap. Namely, a slider of the magnetic head holding reading/writing elements undergoes a pitching motion with respect to a first axis and a rolling motion with respect to a second axis which perpendicularly intersects the first axis to thereby remove uneven swinging motions. Such a magnetic head supporting device is disclosed, for instance, in U.S. Pat. No. 3,931,641, and U.S. Pat. No. 4,167,765.

The conventional magnetic head supporting device disclosed in the above mentioned publications is generally constructed as follows. A supporter comprising a resilient spring portion and a rigid beam portion formed integrally with the resilient spring portion is formed of a resilient metal plate such as a stainless steel plate. A flexible member formed also of a resilient metal plate such as stainless steel is attached to a free end of the supporter. A loading projection is provided either on the upper surface of the flexible member or on the lower surface of the supporter at a position near the free end so that a load is applied from the free end of the supporter to the flexible member. Then, a thin film magnetic head which holds a slider having reading/writing elements, is attached to the lower surface of the flexible member.

There has been known, as a magnetic head used in combination with a magnetic head supporting member, a flying type thin film magnetic head which floats with a space by a minute air bearing to a magnetic recording medium by utilizing a dynamic pressure resulting when the magnetic recording medium is moved. Such a flying type magnetic head is disclosed in, for instance, IBM Disk Storage Technology (February 1980), p. 6–9. As the basic construction disclosed in U.S. Pat. Nos. 4,130,847, 4,218,715 and 4,210,853, reading/writing elements are formed in the end portion at the side of air flow of a slider having an air bearing surface which faces the magnetic recording medium.

FIG. 11 is a perspective view of a conventional thin film magnetic head as disclosed in U.S. Pat. Nos. 4,219,854, 4,219,855 and 4,190,872, wherein a reference numeral 1 designates a slider composed of, for instance, ceramics and numerals 2A, 2B designate reading/writing elements. The slider 1 is provided with a pair of rail portions 101, 102 with a space therebetween at the surface facing a magnetic recording medium wherein the surfaces of the rail portions are finished as air bearing surfaces 103, 104 having high flatness. The air bearing surfaces 103, 104 are respectively provided with taper portions 103a, 104a at their one end portions which constitute air flowing ends with respect to an air flow which flows in the direction of an arrow mark a, in association with the magnetic recording medium. The reading/writing elements 2A, 2B are respectively thin film magnetic head elements prepared in accordance with the same process as an IC manufacturing technology, and the reading/writing elements are respectively formed at the air discharging end portion which opposes the taper portions 103a, 104a.

A numeral 3 designates a protective film of alumina or the like which covers the reading/writing elements 2A, 2B. Numerals 41A, 42A are bonding pads for the reading/writing element 2A, and numerals 41B, 42B designate bonding pads for the reading/writing element 2B. The bonding pads are formed on the protective film 3 at the same end surface as the end surface where the reading/writing elements 2A, 2B are formed. The bonding pads 41A, 42A, 41B, 42B are electrically connected to conductor coils for the reading/writing elements, and lead wires for a magnetic disk apparatus (not shown) are connected to the bonding pads.

In the magnetic head supporting device of this kind, there is the trend of miniaturization in order to comply with a demand of high density and high speed magnetic recording. The miniaturization of the thin film magnetic head is effective to reduce a flying height necessary for the high density recording and to reduce a spacing loss. Further, it is advantageous to increase the resonance frequency in association with the magnetic head supporting device, to eliminate crushing and to improve durability. Further, an appropriate balance is obtainable between the dynamic pressure and the pressure of a supporting spring and the posture of the magnetic head can be properly maintained, whereby stable flying characteristics can be obtained. Further, reduction in the mass of the magnetic head obtained by the miniaturization increases a speed for the accessing movement of the magnetic head supporting device.

In the thin film magnetic head used for the conventional magnetic head supporting device, however, since the bonding pads 41A, 42A, 41B, 42B were formed in the end surface in which the reading/writing elements were also formed, there was a restriction by a space where the bonding pads 41A, 42A, 41B, 42B were to be installed.

SUMMARY OF THE INVENTION

It is an object of the present invention to provide a magnetic head supporting device which is capable of mounting a small-sized thin film magnetic head; effectively reduces a flying height and a spacing boss; is suitable for high density recording; has a high resonance frequency; is effective to improve anti-crashing property and durability; provides a stable floating characteristic by maintaining an appropriate balance between a dynamic pressure and the spring pressure and by maintaining good flying posture; and is capable of accelerating the access movement by reducing the mass of the magnetic head.

The foregoing and other objects of the present invention have been attained by providing a magnetic head supporting device which comprises a thin film magnetic head and a magnetic head supporting member, wherein the thin film magnetic head is provided with a reading/writing element at an end surface of a slider, and bonding pads for the reading/writing element are led to at least a side end surface of the slider, which is different from the end surface where the reading/writing element is located.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
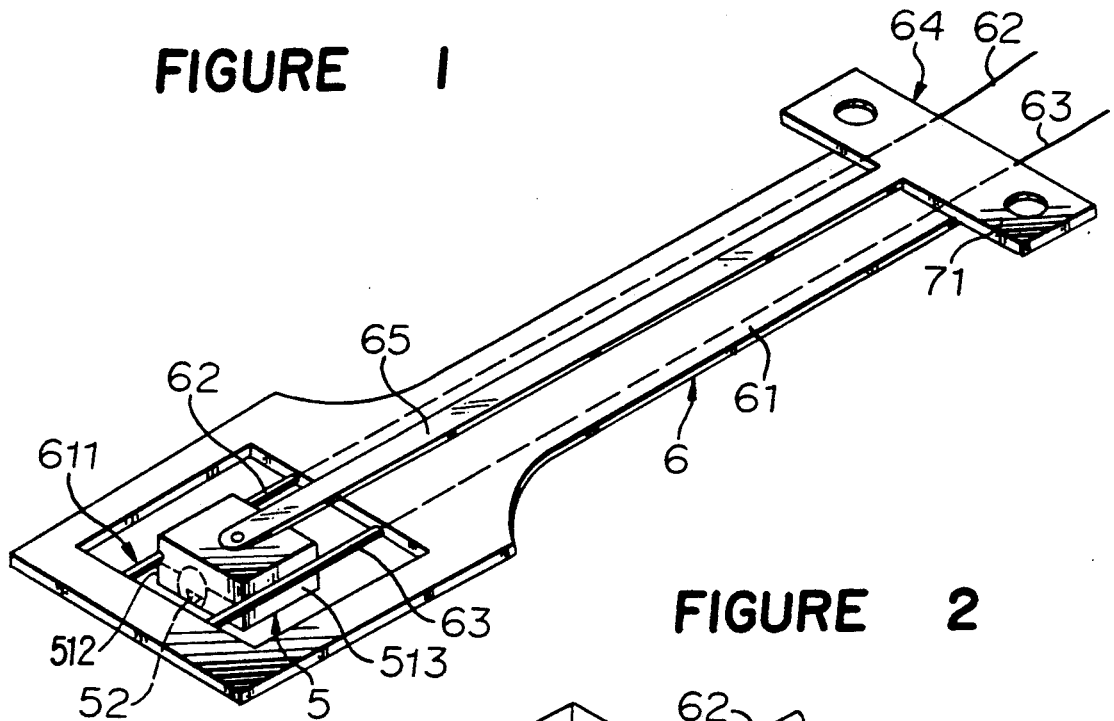
FIG. 1 is a perspective view of an embodiment of the magnetic head supporting device according to the present invention.
Figure 2:
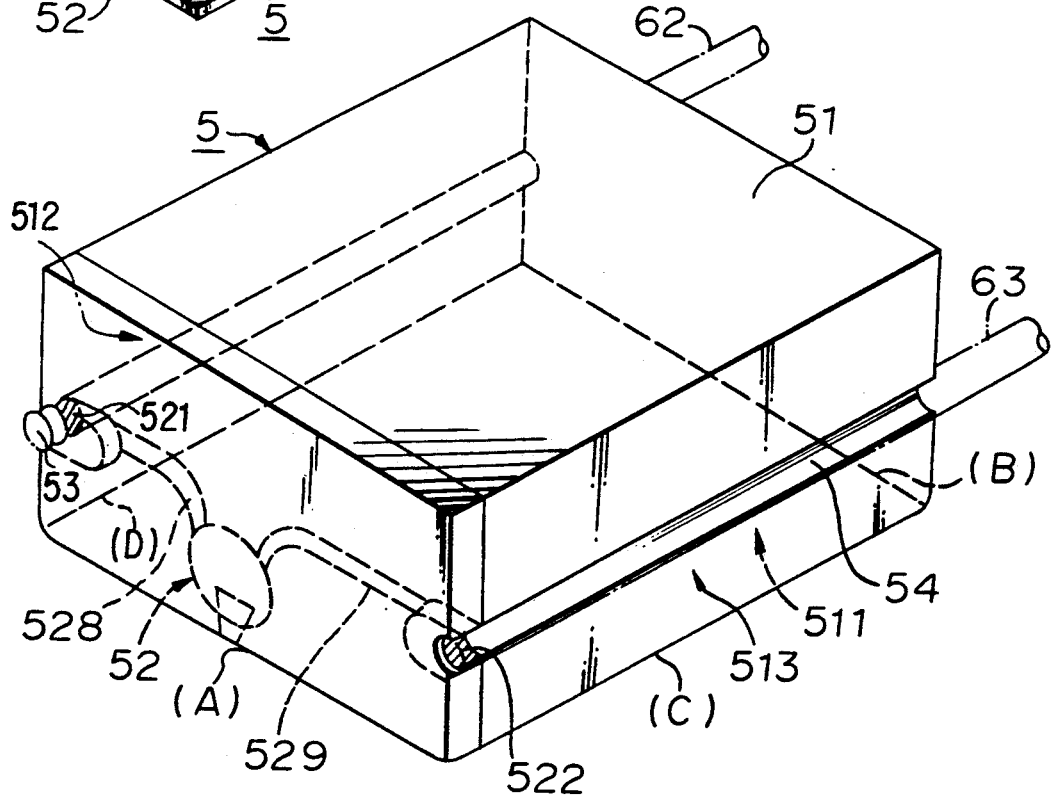
FIG. 2 is a perspective view partly broken of an embodiment of a thin film magnetic head which constitutes the magnetic head supporting device of the present invention.

Referring to the drawings, wherein the same reference numerals designate the same or corresponding parts throughout the several views, and more particularly to FIG. 1 thereof, there is shown in perspective view an embodiment of the magnetic head supporting device according to the present invention. In FIG. 1, a reference numeral 5 designates a thin film magnetic head and a numeral 6 designates a magnetic head supporting device. FIG. 2 is an enlarged perspective view of the thin film magnetic head in which an air bearing surface 511 formed in a slider 51 so as to oppose a magnetic recording medium is made flat without having rail portions and taper portions to produce a lifting force. It is preferable that edges A, B formed at the air bearing surface, when they are viewed with respect to the direction of flowing air a, are respectively in a form of an arc so that the dragging of the slider 51 to the surface of a magnetic disk at the time of contact-start can be eliminated. Other edges C, D may be in a form of an arc.

A reading/writing element 52 is formed in an end surface which is provided at the side of air-discharging of the slider 51, in association with the magnetic recording medium. In this embodiment, a single reading/writing element 52 is used, and the element is arranged at an intermediate portion in the direction of width of the slider.

Bonding pads 521, 522 for the reading/writing element 52 are introduced to opposing side surfaces 512, 513 of the slider 51. Further, grooves 53, 54 in a form of stripe are formed in the opposing side surfaces 512, 513 of the slider 51 in its entire length so as to extend through the bonding pads 521, 522.

Figure 3:
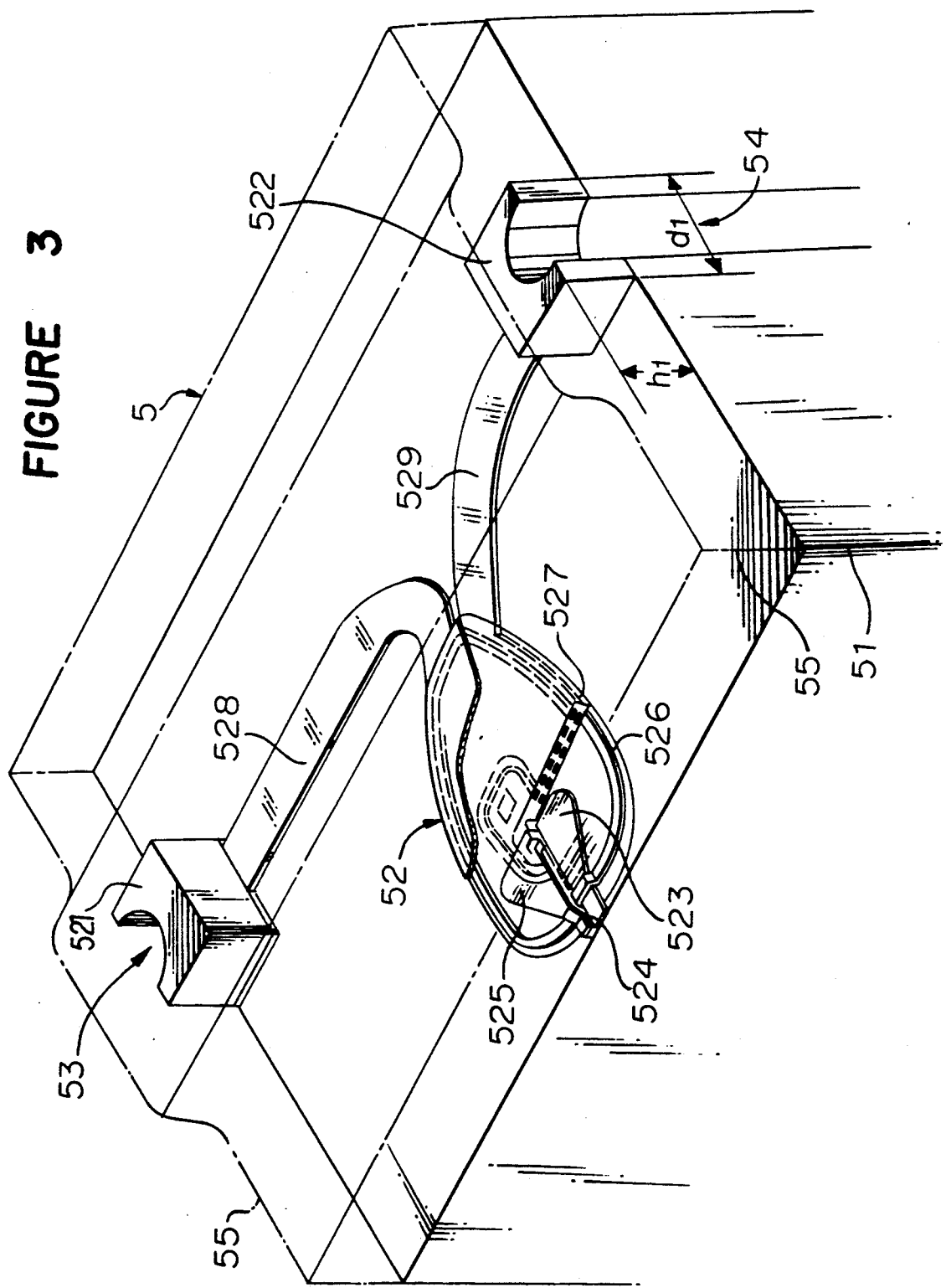
FIG. 3 is an enlarged perspective view partly broken of a reading/writing element.
Figure 4:
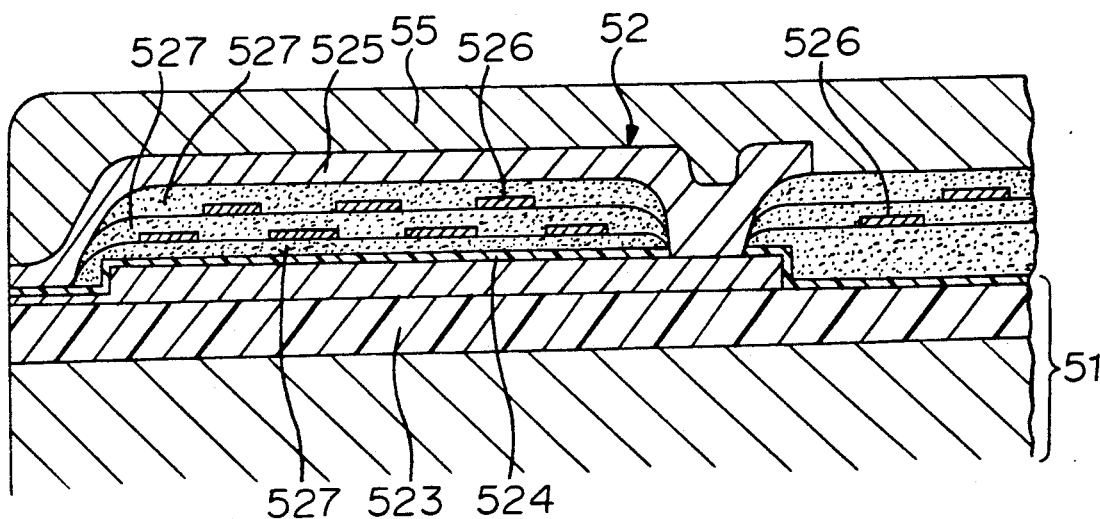
FIG. 4 is an enlarged cross-sectional view of the reading/writing element.
Figure 5:
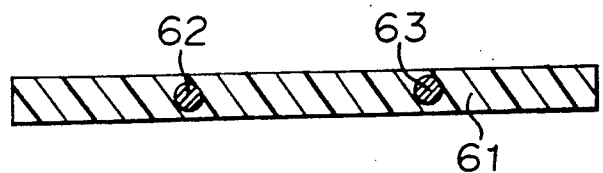
FIG. 5 is a cross-sectional view of a part of the magnetic head supporting device.

FIG. 3 is a perspective view partly omitted showing the construction of the reading/writing element 52 and the bonding pads 521, 522 and FIG. 4 is an enlarged cross-sectional view of the reading/writing element 52. In FIGS. 3 and 4, a reference numeral 523 designates a lower magnetic film, a numeral 524 designates a gap film made of a material such as alumina, a numeral 525 designates an upper magnetic film, a numeral 526 designates conductor coil films, a numeral 527 designates an insulating film made of an organic resinous material such as novolak resin, and numerals 528, 529 designate lead electrodes.

The slider 51 comprises a substrate of $Al_2O_3 \cdot TiC$ on which an insulating film of a material such as alumina or the like is coated, and the reading/writing element 52 is formed on the insulating film.

Each end portion of the lower and upper magnetic films 523, 525 constitute a pole section which opposes each other within the gap film 524 having a small thickness. The pole sections perform reading and writing function. The lower magnetic film 523 is connected with the upper magnetic film 525 at the end portions opposite the pole sections. The conductor coil films 526 are respectively formed so that they are wound around the connecting portion in a spiral form.

The lead electrodes 528, 529 have their one ends connected to both ends of the conductor coil films 526 and other ends connected to the bonding pads 521, 522.

The bonding pads 521, 522 are located at the opposing side surfaces 512, 513 of the slider 51. The bonding pads 521, 522 are formed as plated films so that the surface area of the end portion of each of them exposed at the opposing side surfaces 512, 513 has a sufficient surface area necessary to connect the lead wires. Specifically, the surface area has a width $d_1$ of about 100–250 $\mu m$ and a height $h_1$ of about 50 $\mu m$.

Thus, in the thin film magnetic head of the present invention, the bonding pad 521 or 522 for the reading/writing element 52 is formed in the side surface 512 or 513 of the slider 51. Accordingly, the width of the end surface where the reading/writing element 52 is formed can be reduced to thereby reduce the surface area of the end surface, whereby the entire size of the thin film magnetic head can be reduced unlike the conventional technique wherein the bonding pads 521, 522 are formed in the same end surface where the reading/writing element 52 is formed. Specifically, the size of the slider 51 can be reduced in such a manner that the thickness from the air bearing surface 511 to the opposing upper surface is 0.65 mm or less, the length in the direction of air flow is in a range of 0.5 mm–2 mm and the width in the direction perpendicular to the direction of air flow is in a range of about 0.5 mm–2 mm.

Further, since a cut surface of a wafer, when the wafer is cut to obtain separate thin film magnetic heads in manufacturing steps, constitutes the opposing side surface 512 or 513 in which the bonding pad or pads 521, 522 is formed, the bonding pads 521, 522 can be exposed at the opposing side surfaces 512 or 513 as soon as the cutting operation has finished.

Figure 11:
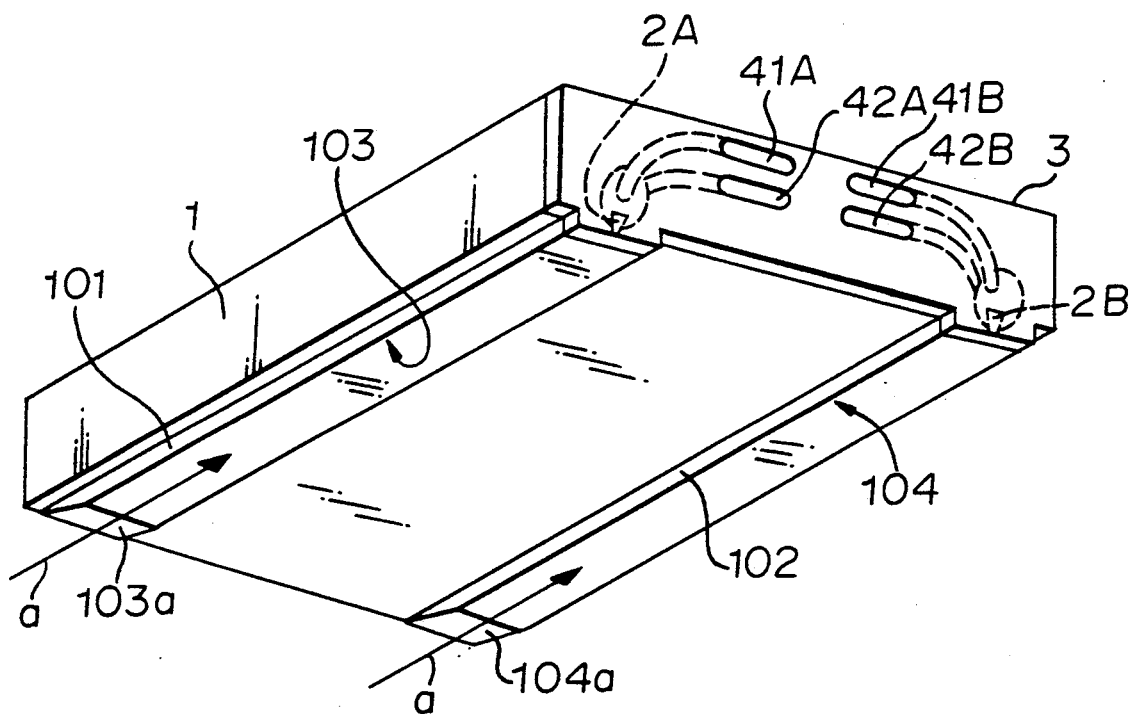
FIG. 11 is a perspective view of a conventional thin film magnetic head.

The bonding pads 521, 522 are covered by a protective film 55. In the conventional magnetic head as shown in FIG. 11, it was necessary to polish the surface of the protective film 55 to thereby expose the electrode surfaces of the bonding pads so as to bond the lead wires. In the present invention, however, such polishing work is unnecessary to thereby simplified manufacturing steps.

Now, returning to FIG. 1, explanation will be continued. The magnetic head supporting device 6 comprises a flexible member 61 and a pair of supporting arms 62, 63. The flexible member 61 is formed in a plate-like shape by using a polymeric resinous material as an insulating material. As a polymeric material used for the flexible member, such a material, e.g. polyimide resin as that having a mechanical strength durable to repeated bending operations and twisting operations and showing an appropriate spring function and elongation is suitable. At one side of the flexible member 61, there is provided an opening 61 where the thin film magnetic head 5 is placed. Thus, by forming the flexible member 61 which is the major part of the magnetic head supporting device 6 by a polymeric resinous material, the flexible member 61 shows a weak spring function and a high degree of freedom of twisting and elongation in comparison with the conventional flexible member made of a resilient metallic material such as stainless steel. Accordingly, even in a case that the size of the magnetic head is reduced to reduce a flying height in order to obtain high density magnetic recording, there is still obtainable a balance between the dynamic pressure produced at the slider 51 and the spring function of the flexible member 61, and therefore, a stable control of the posture of the magnetic head can be obtained.

Further, the flexible member 61 made of a polymeric resinous material allows easy processing. Furthermore, by utilizing the high degree of freedom of twisting and elongation of the polymeric resinous material, the shape and the structure of the flexible member 61 can be simplified, and machining and assembling works to the flexible member can be easy.

As shown in the figures, the supporting arms 62, 63 are embedded in the flexible member 61. Especially, the supporting arms 62, 63 are exposed in the opening 611 so that they are spaced apart from each other in a parallel relation, and each one end of the supporting arms extending through the opening 611 is attached to the flexible member 61. In this embodiment, the supporting arms 62, 63 are formed of an electric conductive material. Each other end opposite the ends extending through the opening is led outside the flexible member 61 so that the other ends are connected to the magnetic disk drive.

The magnetic head 5 is placed between the supporting arms 62, 63 in the opening 611. Each of the supporting arms 62, 63 is connected to each of the opposing side surfaces of the magnetic head 5, and the supporting arms 62, 63 are respectively connected to the bonding pads 521, 522 exposed at the opposing surfaces 512, 513, by means of soldering. A pitching motion and a rolling motion of the thin film magnetic head 5 can be eliminated by the supporting arms 62, 63. Thus, by arranging the supporting arms 62, 63 as described above, the entire structure and assembling works can be simplified.

In the case that the supporting arms 62, 63 are formed of an electric conductive material, they can be used as lead wires for the thin film magnetic head 5, whereby the number of structural elements can be reduced and the entire structure and the assembling works can be simplified.

The supporting arms 62, 63 are placed correctly in position in the grooves 53, 54 and they are connected to the bonding pads 521, 522. Accordingly, reliability in determining position of the magnetic head 5 to the supporting arms 62, 63 and as well as the connection in electrical and mechanical sense of the former to the later can be improved.

Figure 6:
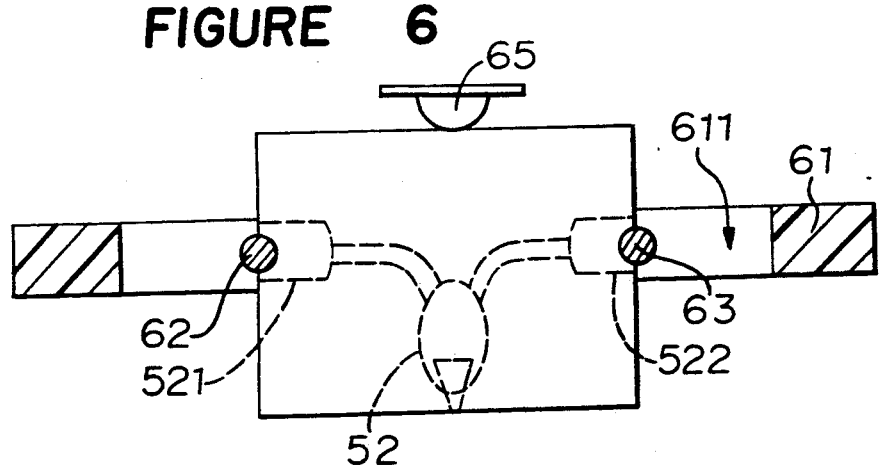
FIG. 6 is a cross-sectional view of another part of the magnetic head supporting device.
Figure 7:
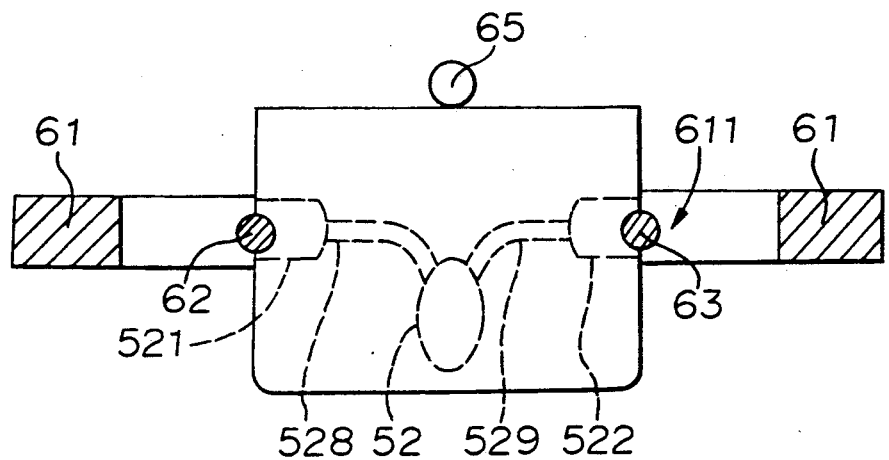
FIG. 7 is a cross-sectional view of a part of the magnetic head supporting device according to another embodiment of the present invention.

A fitting member 64 made of a rigid material such as metal is integrally attached to the other end of the flexible member 61 by means of bonding. A loading arm piece 65 is formed integrally with the fitting member 64. The loading arm piece 65 extends through a surface of the flexible member 61 to the upper surface of the thin film magnetic head 5 which is held in the opening 611. The free end of the loading arm piece 65 is in spring-contact with the upper surface of the thin film magnetic head 5 so that the head 5 receives a load from the arm piece 65 downwardly. The contact of the arm piece 65 to the thin film magnetic head may be of a point contact type as shown in FIG. 6, or may be of a line contact type as shown in FIG. 7 wherein the arm piece 65 is formed to have a circular form in cross-section. Further, it is possible to use a plane contact structure even though it is not shown in the drawing.

Figure 8:
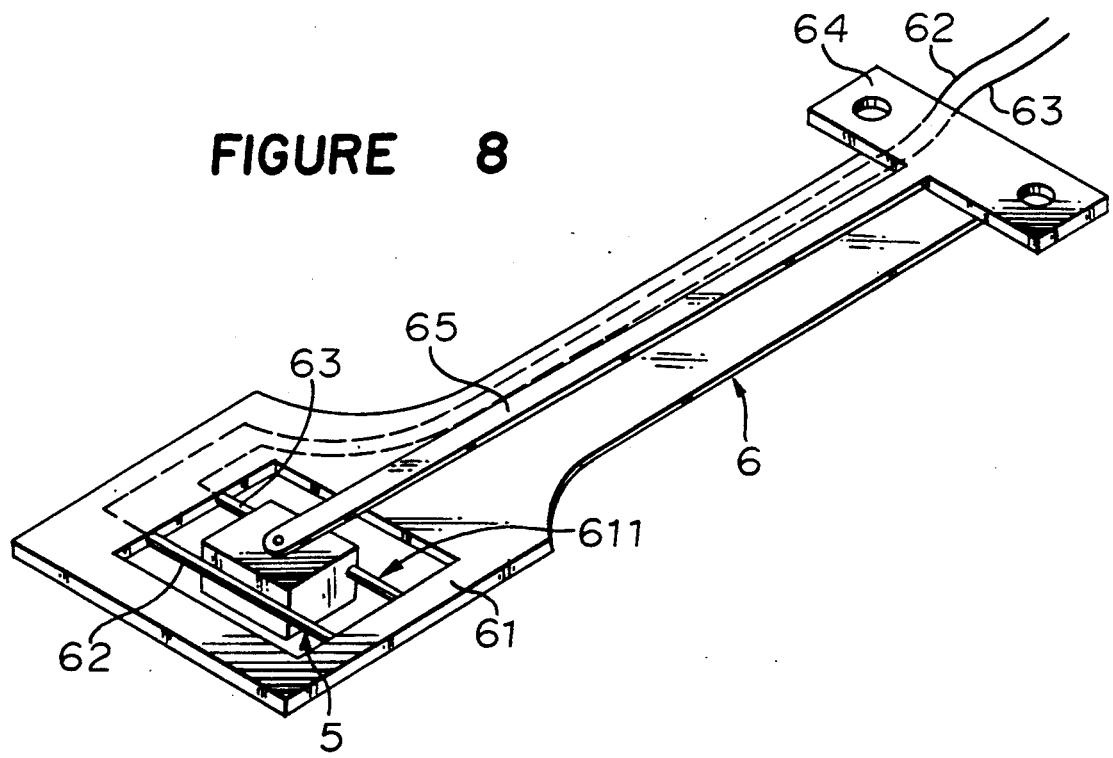
FIG. 8 is a perspective view of another embodiment of the magnetic head supporting device of the present invention.

FIG. 8 shows another embodiment of the magnetic head supporting device according to the present invention. In this embodiment, a pair of supporting arms 62, 63 are arranged in the width direction of the flexible member 61, i.e. in the direction perpendicular to the longitudinal direction of the flexible member 61, and the thin film magnetic head 5 is interposed between the supporting arms 62, 63. The orientation of the thin film magnetic head 5 is in agreement with the direction which is perpendicular to the longitudinal direction of the flexible member 61.

Figure 9:
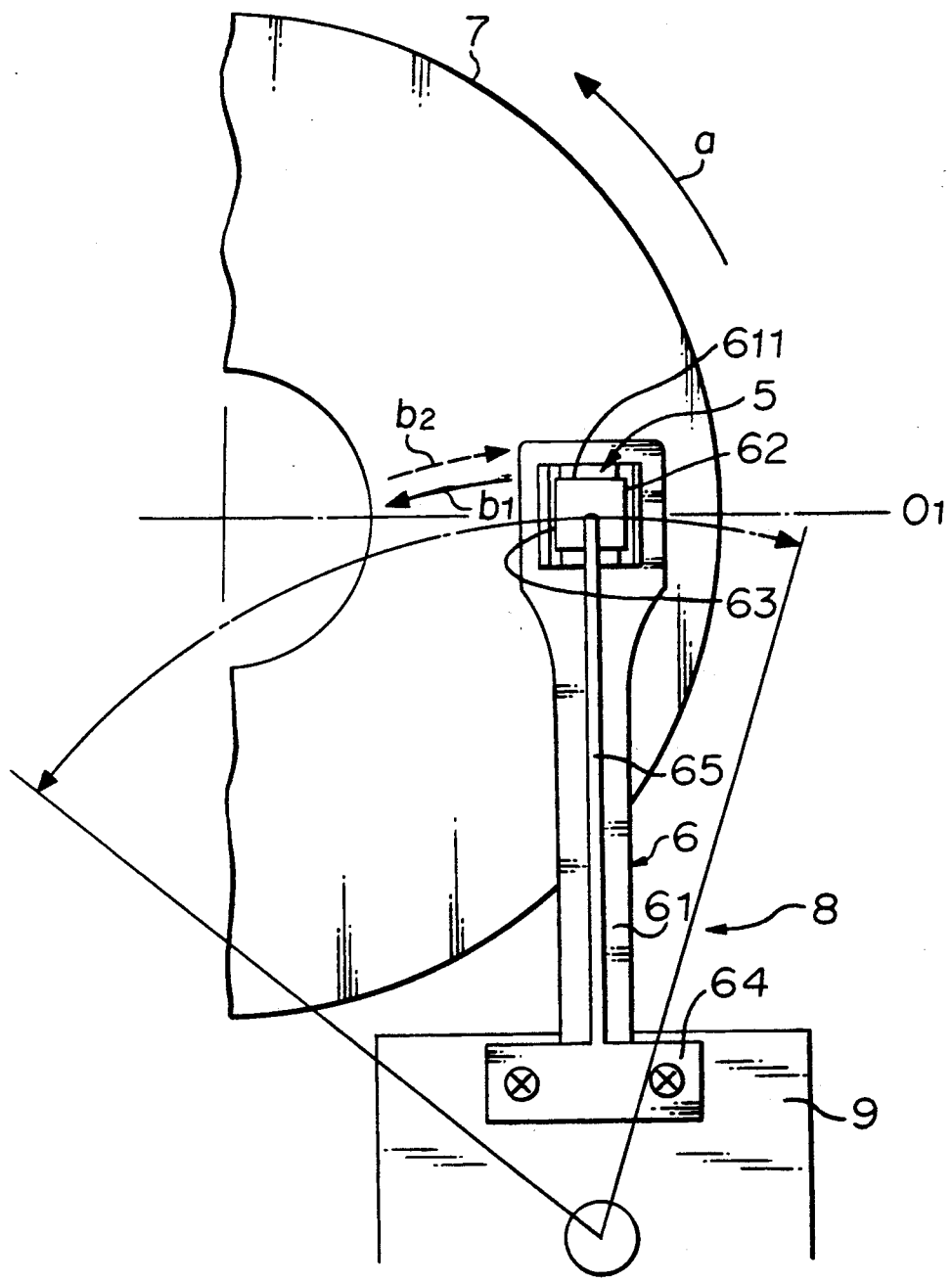
FIG. 9 is a plane view which shows a positional relation of the magnetic head supporting device of the present invention as shown in FIG. 1 to a magnetic disk.

FIG. 9 is a plane view showing a relation of the magnetic head supporting device of the present invention as shown in FIG. 1 to a magnetic disk, wherein a numeral 7 designates the magnetic disk, a numeral 8 designates the magnetic head supporting device of the present invention and a numeral 9 designates a position determining unit. The magnetic disk 7 is driven to rotate in the direction indicated by an arrow mark a by means of a rotation driving unit (not shown). The magnetic head supporting device 8 is driven by the position determining unit 9 so that the thin film magnetic head 5 performs a turning movement on the diameter $O_1$ of the magnetic disk 7 in the direction indicated by an arrow mark $b_1$ or $b_2$. Thus, reading operations or writing operations can be attained on a track in the magnetic disk 7.

Figure 10:
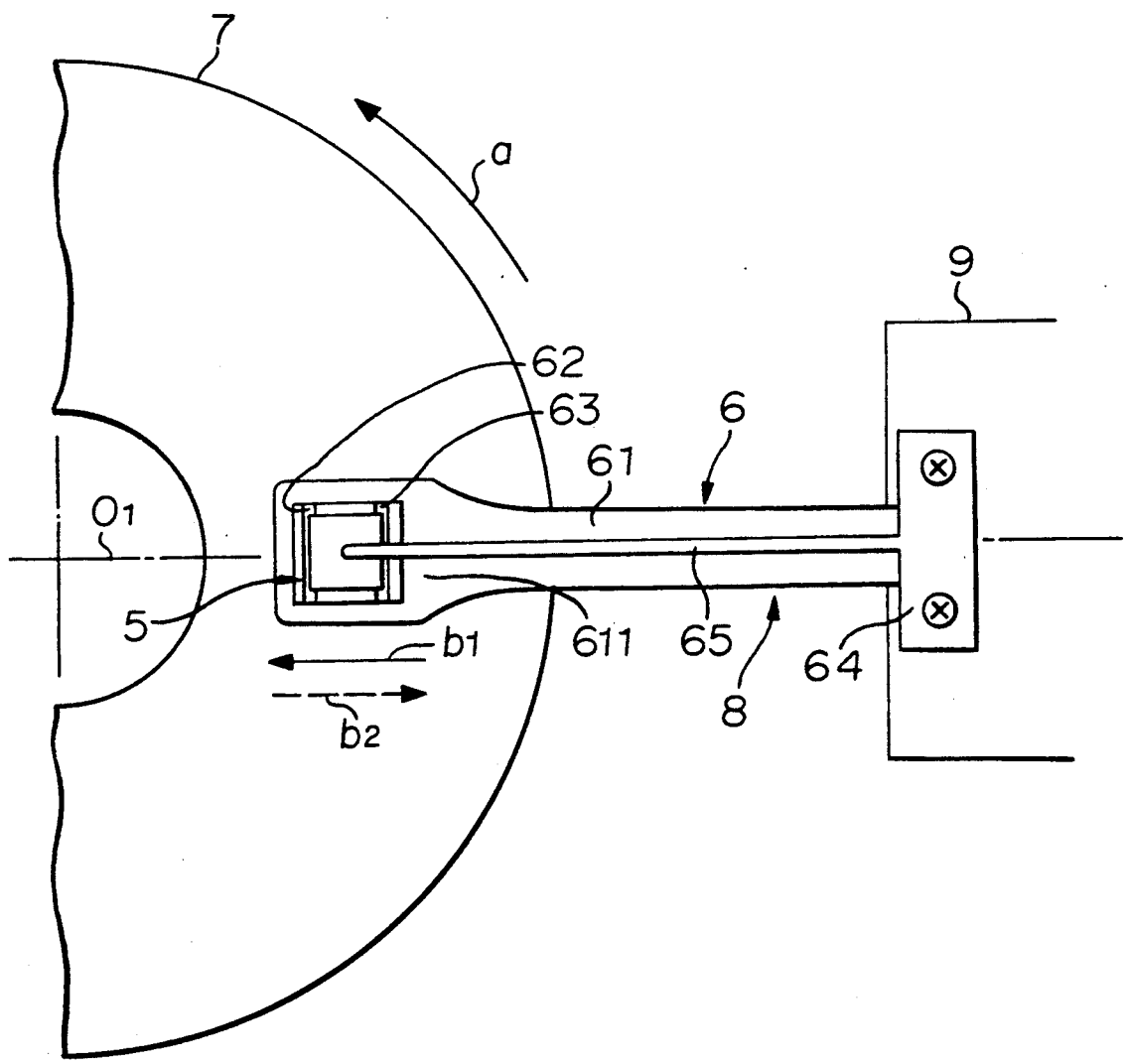
FIG. 10 is a diagram showing a positional relation of the magnetic head supporting device as shown in FIG. 8 to a magnetic disk.

FIG. 10 is a plane view showing a positional relation of the magnetic head supporting device as shown in FIG. 8 to a magnetic disk. In FIG. 10, the magnetic disk supporting device 8 is arranged in alignment with the diameter $O_1$ of rotation of the magnetic disk 7 so that the thin film magnetic head 5 is linearly moved on the diameter $O_1$ in the direction of an arrow mark $b_1$ or $b_2$.

In the above-mentioned embodiment, explanation is made as to use of an in-plane recording and reproducing thin film magnetic head. However, the present invention is applicable to a vertical magnetic recording and reproducing thin film magnetic head. Further, the present invention is applicable to a thin film magnetic head having rail portions and taper portions for producing a floating force in the air bearing surface (FIG. 11) by changing the introducing direction of the lead electrodes and bonding pads. Furthermore, it is possible to use a magnetic head device as disclosed in Japanese Examined Patent Publication 22827/1983 or Japanese Unexamined Patent Publication 93868/1986.

Thus, in accordance with the present invention, the following effects can be obtained.

(a) Since a single reading/writing element is formed at an end surface of the slider of a thin film magnetic head, and bonding pads for the reading/writing element are introduced to at least one opposing end surface which is different from the end surface where the reading/writing element is formed, the surface area of the end surface of the slider where the reading/writing element is formed can be reduced without any restriction necessary to provide the bonding pads, and the entire shape of the thin film magnetic head can be reduced. Accordingly, the magnetic head supporting device of the present invention is effective to reduce a flying height and a spacing loss; is suitable for high density magnetic recording; has a high resonance frequency; is effective to suppress crashing; improves the durability; provides a stable floating characteristic by maintaining the balance between the dynamic pressure and the spring pressure while the posture of flying of the magnetic head is maintained, and is capable of accelerating an access movement by reducing the mass of the magnetic head.

(b) The side surface where the bonding pads are formed is created when a wafer is cut to produce a chip for a thin film magnetic head. Accordingly, it is possible to expose the bonding pads at the side surface as soon as the cutting operation has been completed. Therefore, the manufacturing of the supporting device can be easy.

(c) The bonding pads are exposed to form portions to which lead wires are bonded. Accordingly, it is unnecessary to polish the protective layer which was required in the conventional technique. Therefore, the manufacturing of the magnetic head supporting device having a thin film magnetic head can be easy.

Obviously, numerous modifications and variations of the present invention are possible in light of the above teachings. It is therefore to be understood that within the scope of the appended claims, the invention may be practiced otherwise than as specifically described herein.

What is claimed is:

1. A combination of a magnetic head and a magnetic head supporting device comprising:
   a thin film magnetic head/slider having a periphery comprising first and second opposing end surfaces and first and second opposing side surfaces which are substantially perpendicular to said first and second opposing end surfaces;
   a magnetic head supporting member for supporting said thin film magnetic head/slider;
   a reading/writing element provided on one of said first and second opposing end surfaces of said thin film magnetic head/slider;
   bonding pads located along each of said first and second opposing side surfaces of said thin film magnetic head slider, said bonding pads being electrically connected to said support member and
   connecting means for electrically connecting said reading/writing element provided on said one of said first and second opposing end surfaces with said bonding pads located on said first and second opposing side surfaces.

2. The combination according to claim 1, wherein the magnetic head supporting member includes a flexible member and a pair of supporting arms; the supporting arms are spaced apart from each other and attached to the flexible member, and the thin film magnetic head/slider is disposed between and supported by the supporting arms.

3. The combination according to claim 1, wherein the slider is provided with grooves at said first and second opposing side surfaces, and the supporting arms are axially aligned with said grooves.

4. The combination according to claim 1, further comprising grooves which are formed at said first and second opposing side surfaces of the slider so as to be in communication with the bonding pads; a flexible member contained in the magnetic head supporting member which is made of a polymeric resinous material, and a pair of supporting arms which are made of an electric conducting material, said pair of supporting arms being connected to the bonding pads in the grooves so as to provide an electrical connection for said slider.

* * * * *